June 20, 1950     S. SHALER     2,512,177
STEEL SQUARE
Filed Dec. 14, 1948
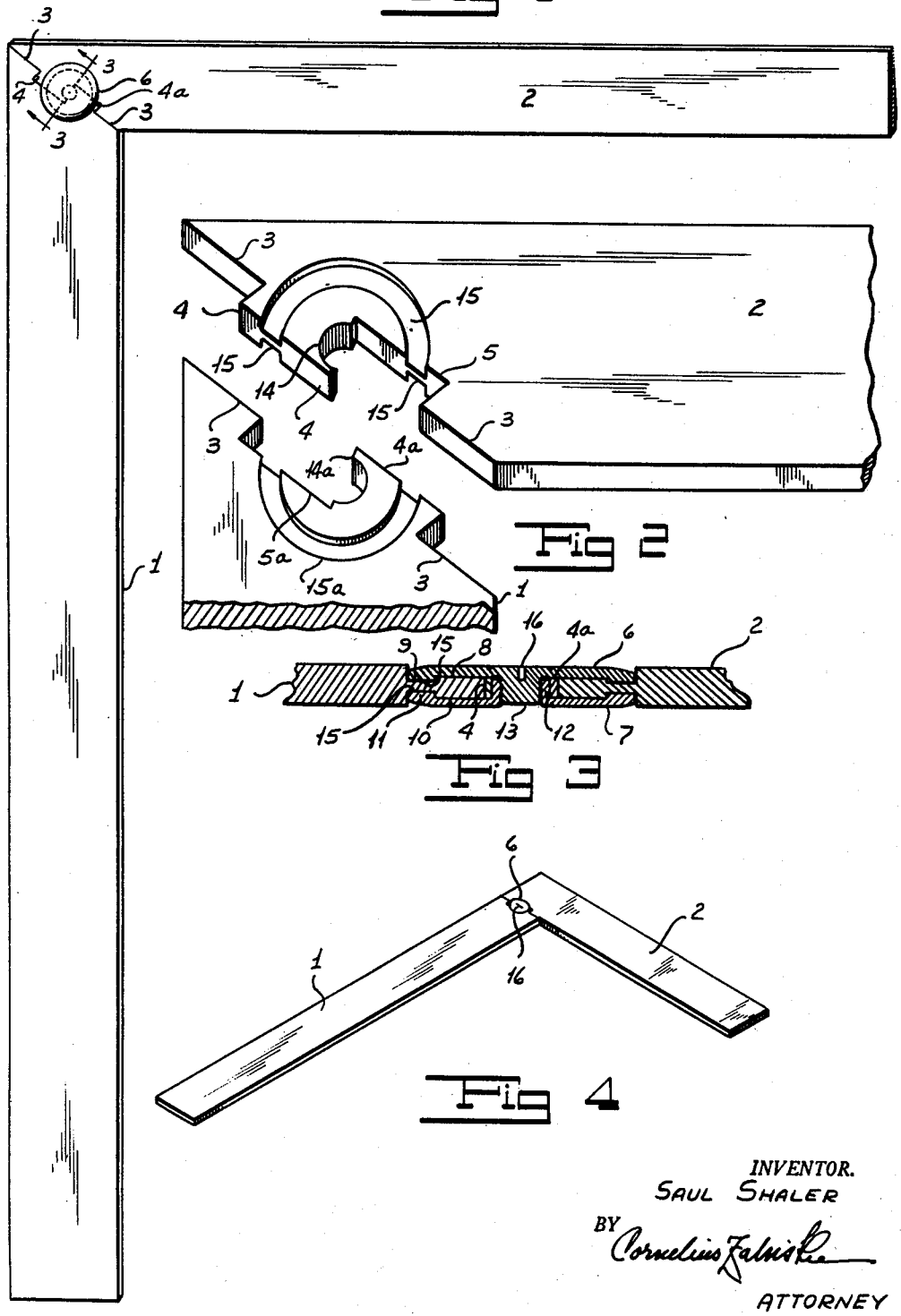
INVENTOR.
SAUL SHALER
BY Cornelius Falvish
ATTORNEY Patented June 20, 1950

2,512,177

UNITED STATES PATENT OFFICE 2,512,177

STEEL SQUARE

Saul Shaler, Jackson Heights, N. Y.

Application December 14, 1948, Serial No. 65,140

3 Claims. (Cl. 33—114)

This invention is a steel square, such as is commonly used by carpenters and builders. These squares are made in various sizes, a very common size being one wherein one leg of the square is 2 feet in length and the other leg 18 inches. A square of this size is inconvenient to carry in a journeyman carpenter's tool box and is also inconvenient to package for shipment. There has therefore long existed a very definite need for a knock-down steel square, i. e., one in which the respective legs of the square may be dismantled for shipping or packing and readily assembled for use.

Attempts have been made to provide such a square, but none of them have proven satisfactory. They are either structurally so weak that they are too easily deformed or broken or are not or will not remain absolutely "square." It is essential that a tool of the character under consideration be accurate, i. e., that the legs of the square be exactly at 90° with respect to one another. The slightest variation from this accuracy will render the tool ineffective for its intended purposes.

The present invention fulfills a long felt want in providing a square which may be economically manufactured, shipped or packed in knocked-down condition, and the parts of which may be quickly assembled into an absolutely accurate tool, sturdy in construction and thoroughly efficient in use.

Generally speaking, the square of this invention embodies two legs of unequal length as heretofore, but these legs are made separate from one another and are adapted to be joined together at the angle of the square by means of interlocking joints extending through the full thickness of the stock from which the legs of the square are formed. By preference the two arms are joined together in a 45° miter, each arm being provided at opposite sides of the miter with correspondingly shaped male and female joint elements such as dovetails, adapted to interfit and interlock with one another and normally secured in assembled relation by a locking bolt passing through a hole which overlaps two male elements of the joint. This bolt has an enlarged head and nut, both of which are undercut and the opposite faces of the joint counterbored, so that there are formed on the bolt and nut marginal ribs received in the corresponding channels in the interfitting elements of the joint. The joint as a whole is thereby reinforced, while the separate elements are firmly secured to one another by the bolt. The exposed surfaces of the head and nut are preferably substantially flush with the opposite faces of the square. A square so constructed may be quickly and easily dismantled or assembled and when in assembled relation its parts will be locked together so firmly that the accuracy of the included angle of the arms will be assured.

Features of the invention, other than those adverted to, will be apparent from the hereinafter detailed description and appended claims when read in conjunction with the accompanying drawing.

The accompanying drawing illustrates different practical embodiments of the invention, but the constructions therein shown are to be understood as illustrative, only, and not as defining the limits of the invention.

Figure 1 shows a square embodying the present invention slightly in perspective.

Figure 2 is a fragmental view showing the arms of the square separated, so that the interfitting joint elements of these parts may be more clearly seen.

Figure 3 is a section on the line 3—3 of Figure 1.

Figure 4 shows a modified form of the invention.

In the drawings, 1 designates the long arm of the square and 2 the short arm. In practice this square is fabricated from square edge stock with the parts cut to length, blanked, milled and broached by a series of simple conventional manufacturing operations to produce this square with a minimum of operations which may be economically performed.

In Figures 1–3 of the drawings, the two arms of the square are joined together at 45° miter indicated at 3. This miter determines, generally speaking, the plane of symmetry of the joint, this plane being normal to the plane of the faces of the square. The short arm 2 is provided along the miter 3 with a projecting dovetail 4 and a recess 5, the dovetail and recess being of identical size and positioned at opposite sides of the plane of the miter. The long arm 1 is similarly provided with a dovetail projection 4a and a correspondingly shaped recess 5a which are likewise positioned on opposite sides of the plane of the miter 3.

It is advantageous to make both of the dovetail projections and the recesses of the respective parts of identical shape and size and to position them in complementary relation for, by so doing, it is possible to blank and mill both parts through the use of the same tools and thereby greatly economize in manufacturing costs. When thus made, the parts 4 and 5 may be accurately interfitted with the parts 5a and 4a respectively, to produce a very close and accurate fit, so accurate in fact as to permit of no loss motion deviation in the angle of the square.

The joint elements are maintained in assembled relation by means of a bolt of special construction, comprising a head 6 and a nut 7, each of which is in the form of a relatively large plate. The head is undercut, as indicated at 8, to provide on its under surface an annular marginal bead 9 and the nut 7 is similarly undercut at 10 in its upper surface to provide an annular marginal bead 11, said nut being also provided with a relatively deep hub 12 to receive the threaded shank 13 of the bolt.

This bolt is adapted to be passed through an opening collectively formed in the two dove tail projections 4 and 4a of the two arms, the portion 14 of the hole being in the dovetail projection 4 and the portion 14a of the hole being in the dovetail projection 4a. The opposite faces of both arms are bored coaxially of the bolt hole, so that the outer faces of the head and nut of the bolt may be substantially flush with the opposite faces of the square, while an additional counterboring operation provides annular channels 15 and 15a coaxially of the hole and adapted to receive the beads 9 and 11, as shown best in Figure 3. The channels 15 and the beads 9 and 10 are made to accurately fit one another and thus serve to greatly strengthen the connection between the arms 1 and 2 and bind them firmly together, so that, if a great strain is placed on these arms, the dovetail joint elements will not be called upon to alone bear these strains.

A bolt has been described as used to bind the joint elements in assembled relation, but, if desired, the head 6 of the bolt may be in the form of a washer while the threaded shank or post may be in the form of a screw passed through the washer and preferably countersunk therein. This is optional. I prefer the bolt, however, as it results in less parts and, if desired, either the head or nut may be spot welded to one of the arms so that it will not get lost when the parts are dismantled. In any event, a slot 16 is provided for the introduction of a screw driver by means of which the bolt may be attached or removed, although an Allen screw hole or special wrench holes may be provided in either the head or nut portion of the bolt without departing from this invention.

In the structure of Figures 1–3, the joint between the arms of the square is shown at a 45° miter at the angle of the square. If desired, however, the same type of joint may be made at right angles to one of the arms as shown in Figure 4, the parts being interlocked in the same manner as shown in the preceding figures and secured together by a bolt or screw as described.

In the accompanying drawings I have chosen to show the interlocking joint elements as of substantially dovetail configuration for I find this form of joint element peculiarly adapted for the present purposes. It is easy to manufacture and machine to such close tolerances as are necessary to accuracy of the finished article. I may, however, employ other forms of interlocking joints, such as circular head, T-head or other similar types of joint which actually interlock to hold the elements of the joint together by virtue of the joint structure itself. Ordinary straight sided tenons will not do this for a tenon can be readily withdrawn in the direction of its length and must depend upon extraneous fastening devices to secure it against withdrawal under stresses which would affect the accuracy of the square. A dovetail joint as well as similar interlocking joints are not open to this objection for they cannot be withdrawn from one another by a straight pull or by stresses circumferentially of the angle of the square. What is required is a locking joint which will permit disengagement of its elements in a direction normal to the face of the square and squares are not ordinarily subjected to such forces, at least such forces do not affect the accuracy of the square.

The present invention is therefore to be understood as contemplating the use of interlocking joints formed in the arms 1 and 2 in complementary relation to one another, i. e., joints which actually interlock of and by themselves against the forces which would change the angle of the square.

In the structure shown in the drawings, the bolt which maintains the joint elements against separation in a direction normal to the face of the square is so formed as to also reinforce the joint against changes in angular relation between the two arms of the square. This is the preferred form of the invention, although the invention is not necessarily limited to such a holding means as some other suitable holding means for maintaining the arms of the square in a common plane may be utilized without departing from the invention. It is also within the purview of this invention to employ the clamping means to the exclusion of the interlocking joint elements though this structure is not as satisfactory as the preferred form of this invention.

It will of course be understood that the square of this inventon may have stamped or otherwise delineated upon the faces of its arms, appropriate dimensional and other scales, such as are commonly found on steel squares, but these scales form no part of the present invention.

The foregoing detailed description sets forth the invention in its preferred forms, but the invention is to be understood as fully commensurate with the appended claims.

In the foregoing description I have referred to this invention as a "steel square." These squares are generally made with both arms of the square of steel. However, in the garment industry, squares in the nature of steel squares are made with arms of wood joined together at the angle by metal fittings permanently secured to both arms. The present invention may be incorporated in such a square by mounting upon the wooden arms at the apex of the square metal fittings having interlocking joints and clamping plates as hereinbefore described. The invention is to be understood as fully commensurate with this concept and is not necessarily limited to an all steel square.

Having thus fully described the invention, what I claim as new and desire to secure by Letters Patent is:

1. A steel square comprising: arms arranged at right angles to one another and occupying a common plane, each of said arms having a single male dove-tail joint element and a single female dove-tail joint element, with the complementary elements of both arms interfitting one another to form a joint with its line of symmetry extending diagonally across the angle formed by the two arms, there being formed in the opposite faces of both arms coaxial annular channels which extend across said joint between said arms, a single bolt hole extending through both arms coaxially of said channels and intersected by the joint, and a single bolt having a shank extending through said hole with its head having a bead seated in the channel at one face of the square and its nut also having a bead seated in the channel at the other face of the square to rigidly hold the arms in said common plane.

2. A steel square as claimed in claim 1, wherein the opposite faces of the arms of the square are recessed to receive the head and nut of the bolt to render the outer faces of said head and nut flush with said faces of the arms.

3. A steel square as claimed in claim 1, wherein both the head and nut of the bolt are circular and are recessed into the opposite faces of the square to be flush with said faces.

SAUL SHALER.

REFERENCES CITED

The following references are of record in the file of this patent:

UNITED STATES PATENTS

| Number | Name | Date |
|---|---|---|
| 523,500 | Zuck | July 24, 1894 |
| 971,615 | Humphries | Oct. 4, 1910 |
| 1,064,953 | Altwein | June 17, 1913 |